(12) United States Patent
Tong

(10) Patent No.: US 11,078,057 B2
(45) Date of Patent: Aug. 3, 2021

(54) REMOTE CONTROLLER

(71) Applicant: Ningbo Zhongxin Electronic Technology Co., Ltd., Zhejiang (CN)

(72) Inventor: Mingkui Tong, Zhejiang (CN)

(73) Assignee: Ningbo Zhongxin Electronic Technology Co., Ltd., Zhejiang (CN)

( * ) Notice: Subject to any disclaimer, the term of this patent is extended or adjusted under 35 U.S.C. 154(b) by 0 days.

(21) Appl. No.: 16/718,215

(22) Filed: Dec. 18, 2019

(65) Prior Publication Data
US 2021/0147198 A1 May 20, 2021

(30) Foreign Application Priority Data

Nov. 14, 2019 (CN) .......................... 201921971205.9

(51) Int. Cl.
| | |
|---|---|
| *F21V 21/30* | (2006.01) |
| *G05B 11/01* | (2006.01) |
| *B66D 1/46* | (2006.01) |
| *G08C 17/02* | (2006.01) |
| *B66D 3/20* | (2006.01) |
| *G05G 1/10* | (2006.01) |

(Continued)

(52) U.S. Cl.
CPC .............. *B66D 1/46* (2013.01); *A63F 13/24* (2014.09); *B66D 3/20* (2013.01); *G05G 1/06* (2013.01); *G05G 1/10* (2013.01); *G08C 17/02* (2013.01); *H04B 10/50* (2013.01)

(58) Field of Classification Search
CPC .......... F21V 21/30; F21V 23/02; F21V 29/83; F21V 29/89; F21V 31/005; F21V 5/007; F21V 5/04; F21Y 2105/10; F21Y 2115/10; A45F 2005/025; H04B 10/50; H04B 10/501; H04B 10/502; H04B 10/503; G05G 1/00; G05G 1/06; G05G 1/085; G05G 1/087; G05G 1/10; G05G 7/00; H04N 21/42206; H04N 21/42222; A63F 13/24
See application file for complete search history.

(56) References Cited

U.S. PATENT DOCUMENTS

| | | | |
|---|---|---|---|
| 9,995,432 B1 * | 6/2018 | Girault | ................. G06F 1/1686 |
| 2007/0012136 A1 * | 1/2007 | Burner | ............... A63B 21/4017 74/502.2 |

(Continued)

FOREIGN PATENT DOCUMENTS

| | | |
|---|---|---|
| CN | 207676473 | 7/2018 |
| EP | 3428505 | 1/2019 |

(Continued)

OTHER PUBLICATIONS

"Office Action of Australia Counterpart Application", dated Jul. 22, 2020, p. 1-p. 8.

*Primary Examiner* — Dionne Pendleton
(74) *Attorney, Agent, or Firm* — JCIP Global Inc.

(57) ABSTRACT

A remote controller includes a shell having an upper shell and a lower shell, and further includes a light emitting module and a fixing plate for fixing the light emitting module. The fixing plate is fixedly connected to an inner side of the lower shell. The light emitting module is fixedly connected to one side, far away from the lower shell, of the fixing plate. The fixing plate is provided with a first light-transmitting hole for displaying the light emitting module; and the lower shell is provided with a second light-transmitting hole for displaying the fixing plate.

7 Claims, 14 Drawing Sheets

(51) Int. Cl.
    *G05G 1/06*          (2006.01)
    *A63F 13/24*        (2014.01)
    *H04B 10/50*      (2013.01)

(56) References Cited

U.S. PATENT DOCUMENTS

| | | | | |
|---|---|---|---|---|
| 2011/0164428 | A1* | 7/2011 | Brutsche | F21V 21/108 |
| | | | | 362/427 |
| 2012/0194326 | A1* | 8/2012 | Kazama | G08C 23/04 |
| | | | | 340/12.54 |
| 2015/0354803 | A1* | 12/2015 | Yu | F21V 29/83 |
| | | | | 362/19 |

FOREIGN PATENT DOCUMENTS

| | | | | |
|---|---|---|---|---|
| EP | 3428508 A1 * | 1/2019 | | F21V 23/0435 |
| KR | 101998623 | 7/2019 | | |
| WO | 2017176388 | 10/2017 | | |

* cited by examiner

REMOTE CONTROLLER

CROSS-REFERENCE TO RELATED APPLICATION

This application claims the priority benefit of China application serial no. 201921971205.9, filed on Nov. 14, 2019. The entirety of the above-mentioned patent application is hereby incorporated by reference herein and made a part of this specification.

BACKGROUND

Technical Field

The disclosure relates to the technical field of remote control equipment, in particular to a remote controller.

Description of Related Art

Remote controller is a wireless transmitting device. The key information is encoded by a modern digital encoding technology, light waves are transmitted via an infrared diode, the received infrared signals are converted into electric signals by an infrared receiver of the receiver, the electric signals are decoded by a processor, and corresponding instructions are demodulated to meet the operation requirements required by control.

Chinese Patent Publication No. CN207676473U discloses a novel electric capstan remote controller, which includes a remote controller panel and a remote controller shell, wherein the remote controller panel is connected with the remote controller shell. A wireless mode indicator light, a wire-control mode indicator light, a remote control power button, a capstan rope-coiling button and a capstan rope-releasing button are provided on a front surface of the remote controller panel. The remote control power button is provided in a middle position of the remote control panel. A wireless mode indicator light, a wire-control mode indicator light, a capstan rope-coiling button and a capstan rope-releasing button are respectively provided around the remote control power button. A back surface of the remote controller panel is provided with a circuit board used for controlling each device on the remote controller panel to work. A battery is arranged in the remote controller shell, an aviation plug is provided at an end part of the remote controller shell, and the aviation plug is connected with an external aviation socket.

The capstan remote controller is a remote controller used for controlling the capstan. The capstan is usually used for releasing the off-road vehicle from being trapped when the off-road vehicle falls into a mud pit. As no light source exists in the field at night, and in order to conveniently see the surrounding environment, people use the capstan remote controller for controlling the capstan while additionally carrying light sources such as a flashlight and the like, so that the capstan remote controller is very inconvenient.

SUMMARY

The purpose of the disclosure is to provide a remote controller with a lighting device, which can simultaneously illuminate the surrounding environment when the remote controller is used.

The purpose of the disclosure is achieved by the following technical solution.

A remote controller comprises a shell having an upper shell and a lower shell, and further comprises a light emitting module and a fixing plate for fixing the light emitting module, wherein the fixing plate is fixedly connected to an inner side of the lower shell. The light emitting module is fixedly connected to one side, far away from the lower shell, of the fixing plate. The fixing plate is provided with a first light-transmitting hole for displaying the light emitting module. The lower shell is provided with a second light-transmitting hole for displaying the fixing plate.

By adopting the above technical solution, due to the arrangement of the light emitting module, the remote controller can illuminate at night without additionally carrying devices such as a flashlight; and meanwhile, the light emitting module can be embedded into the shell in a manner that the fixing plate and the light emitting module are provided in the lower shell, so that the light emitting module is prevented from being damaged by being directly exposed outside the shell, and the service life of the light emitting module is prolonged.

The disclosure is further provided as follows: fixing blocks are respectfully fixedly connected to both sides of the fixing plate, limiting convex columns are fixedly connected to the inner side of the lower shell, and fixing holes into which the limiting convex column respectfully penetrates are provided in the fixing blocks.

By adopting the above technical solution, the fixing block is convenient to install in a mode that the limiting convex column penetrates into the fixing hole, and it is simple and easy to produce the structure, with production cost reduced; and meanwhile, it is convenient to disassemble and replace in the later period by the fixing mode.

The disclosure is further provided as follows: the fixing plate is provided with a positioning protrusion. The light emitting module is provided with a positioning hole into which the positioning protrusion penetrates. The fixing plate is provided with limiting blocks for limiting a rotation of the light emitting module around the positioning protrusion.

By adopting the above technical solution, the fixing mode that the positioning protrusion penetrates into the positioning hole enables to mount and dismount the fixing plate and the light emitting module conveniently. The light emitting module is further prevented from rotating around the positioning protrusion due to the arrangement of the limiting blocks, so that the fixing fastening strength of the positioning protrusions is improved, the assembling efficiency is improved, and the production cost is reduced.

The disclosure is further provided as follows: the limiting blocks are provided with limiting grooves into which the light emitting module penetrates. The limiting blocks are provided at four apex angles of the light emitting module. A groove wall of each of the limiting grooves abuts against a side edge of the light emitting module.

By adopting the above technical solution, the mode that the limiting groove is provided on the limiting block can play a role in pre-mounting the light emitting module, the light emitting module is prevented from being dislocated due to the rotation of the limiting block around the positioning protrusion, and the light transmission effect of the light emitting module is prevented from being influenced; and meanwhile, assembly and disassembly can be completed only by simply pulling and inserting, the assembly efficiency is high, and the production cost is low.

The disclosure is further provided as follows: a transparent cover plate is provided in the first light-transmitting hole.

By adopting the above technical solution, on the premise that the light-emitting degree of the light emitting module is not influenced, the transparent cover plate is provided so that the light emitting module is relatively isolated from an outside of the shell, and the light emitting module is prevented from being scored or scratched by external sharp objects; and it will prevent dust from entering inside, and guarantees the lighting effect.

The disclosure is further provided as follows: the shell comprises a gripping portion, an outside of the gripping portion is sleeved with a grip, the grip being rotatably connected to the shell.

By adopting the above technical solution, the grip is rotationally connected with the shell, so that a person can change the lighting area corresponding to the light emitting module by rotating the shell in the process of lighting using the remote controller, and the use experience of the user is improved.

The disclosure is further provided as follows: a rotating column is fixedly connected to the grip and penetrates into the shell. The grip rotates relative to the shell in an axial direction of the rotating column.

By adopting the above technical solution, the rotating column is provided in a penetrating manner so that the grip can rotate relative to the shell along the rotating column, with a simple structure and convenient production. The convenient assembly saves the installation time of workers and the production cost.

The disclosure is further provided as follows: a part of the rotating column penetrating into the shell is provided with at least one tooth groove along an outer circumferential surface thereof. An elastic clasp is provided in the shell and penetrates into the tooth groove to prevent the grip and the shell from rotating relatively.

By adopting the above technical solution, the elastic clasp is clamped in the tooth groove, so that the grip can be fixed relative to the shell in the rotating process. The grip and the shell can be fixed relative to each other via the elastic clasp after rotating for a certain angle, so that the illuminated area can be guaranteed not to be changed, and it is easy to control and convenient to use. When the elastic clasp and the rotating column mutually collide, the increased strength for rotating the grip can deform the elastic clasp and cause the rotating column to continue to rotate; and when the elastic clasp and the rotating column are separated from each other, the elastic clasp returns to the original state and continues to penetrate into the tooth groove, so as to restrict the relative rotation of the grip and the shell again.

The disclosure is further provided as follows: the grip is provided with a magnet.

By adopting the above technical solution, the magnet is provided so that the remote controller can be fixed on metal products such as iron and the like which can be adsorbed by the magnet. When the remote controller needs to illuminate for a long time and does not need to be held by hands, the requirement for long-time illumination can be met by adsorbing the remote controller on objects such as iron and the like, which is convenient to use.

In summary, the disclosure has the following beneficial technical effects.

1. Due to the arrangement of the light emitting module, the remote controller can illuminate at night without additionally carrying devices such as a flashlight; and meanwhile, the light emitting module can be embedded into the shell in a manner that the fixing plate and the light emitting module are provided in the lower shell, so that the light emitting module is prevented from being damaged by being directly exposed outside the shell, and the service life of the light emitting module is prolonged.

2. The grip is rotationally connected with the shell, so that a person can change the lighting area corresponding to the light emitting module by rotating the shell in the process of lighting using the remote controller, and the use experience of the user is improved.

3. The elastic piece is clamped in the tooth groove, so that the grip can be fixed relative to the shell in the rotating process, and the illuminated area can be guaranteed not to be changed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The present disclosure is described in further detail below with reference to the accompanying drawings.

Figure 1:
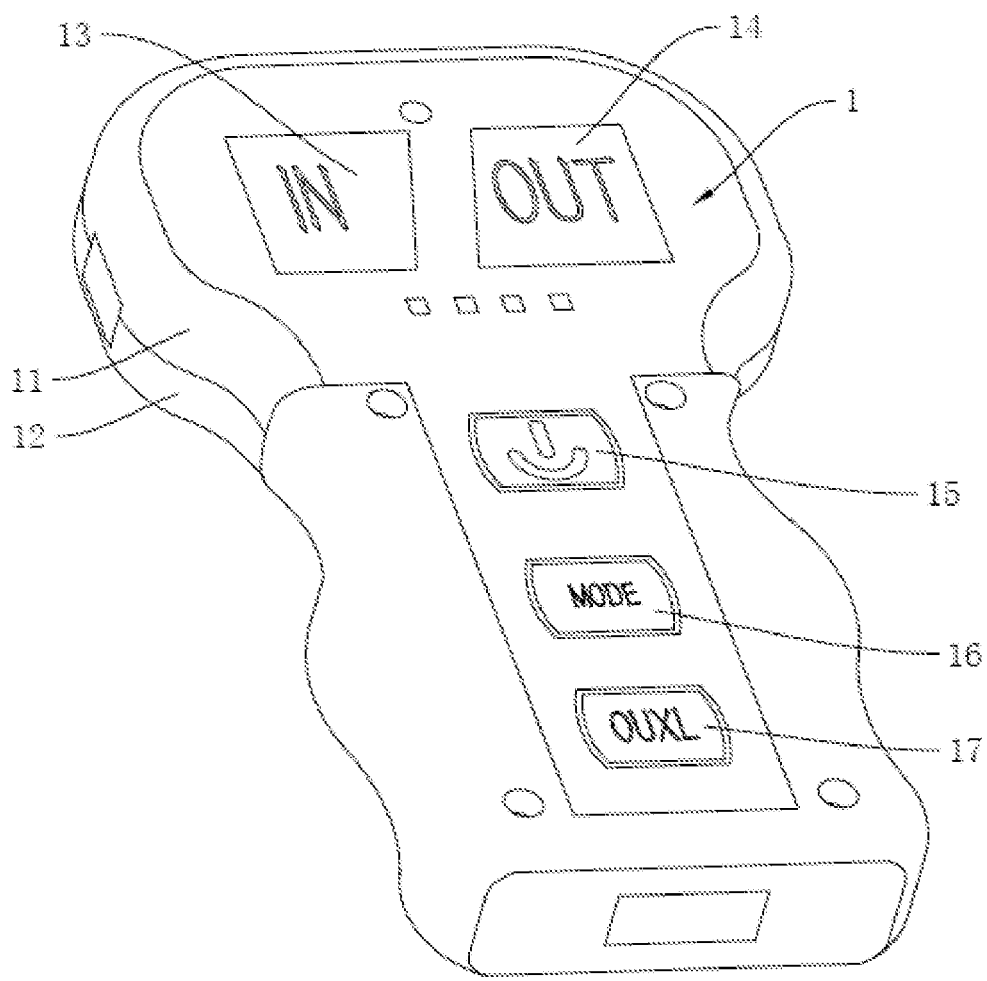
FIG. 1 is a structurally schematic diagram of the disclosure.
Figure 2:
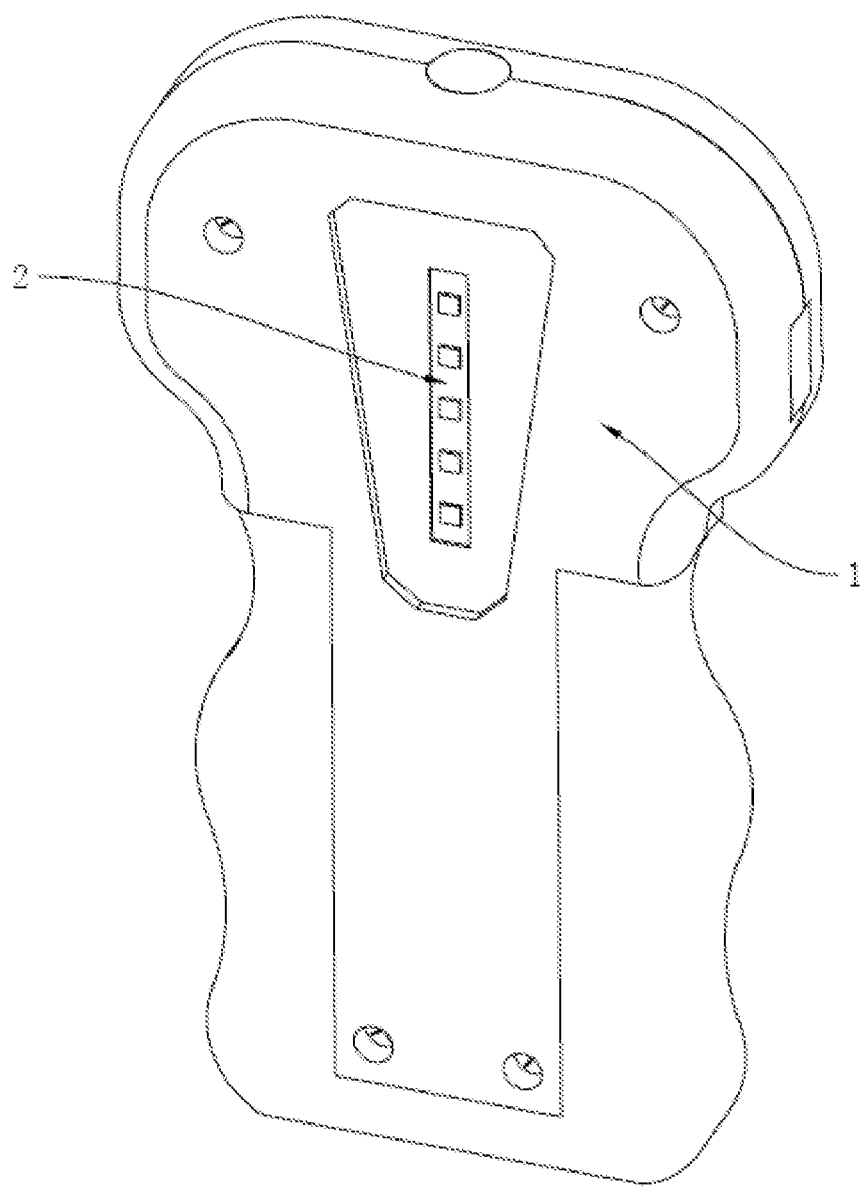
FIG. 2 is a rear view of the disclosure.

As shown in FIGS. 1 and 2, it is a remote controller disclosed by the embodiment comprising a shell 1 having an upper shell 11 and a lower shell 12. The upper shell 11 and the lower shell 12 are both provided hollowly, mutually attached and form an receiving cavity at a hollow position, and the fixing of the upper shell 11 and the lower shell 12 can be realized via bolts and the like. A main circuit board (not shown) is provided in the shell 1 and is electrically connected with a line-coiling button 13 for controlling a capstan, a line-releasing button 14, and a power button 15 for controlling a switch of the remote controller. The buttons all protrude outside the upper shell 11 to perform corresponding functions with the buttons being pressed.

Figure 3:
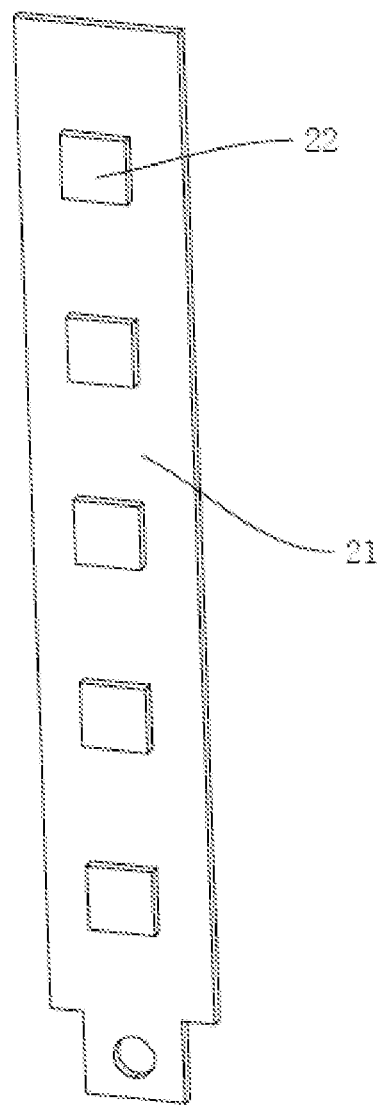
FIG. 3 is a structurally schematic view of a light emitting module.

As shown in FIGS. 2 and 3, a light emitting module 2 is provided on the lower shell 12 and in the receiving cavity. The light emitting module 2 is provided as an LED module which is composed of an auxiliary circuit board 21 and paster-type LED lamp beads 22 fixed on the auxiliary circuit board 21. A plurality of paster-type LED lamp beads 22 can be provided. In the embodiment, the paster-type LED lamp beads 22 are preferably provided with five and are provided on the auxiliary circuit board 21 in an array.

As shown in FIGS. 1 and 2, the main circuit board is also electrically connected with a mode button 16 for selecting a mode and an illumination button 17 for controlling the light emitting module 2 to be turned on or off, the light emitting module 2 can be controlled to be turned on or off by pressing the illumination button 17, and the light emitting module 2 can be controlled to be turned on or off according to different modes by pressing the mode button 16, such as a normal on of the light emitting module or a fast blink of the light emitting module 2, or the light emitting module 2 is switched among light-emitting modes such as a cycle blink of three short, three long, and three short, and the like.

Figure 4:
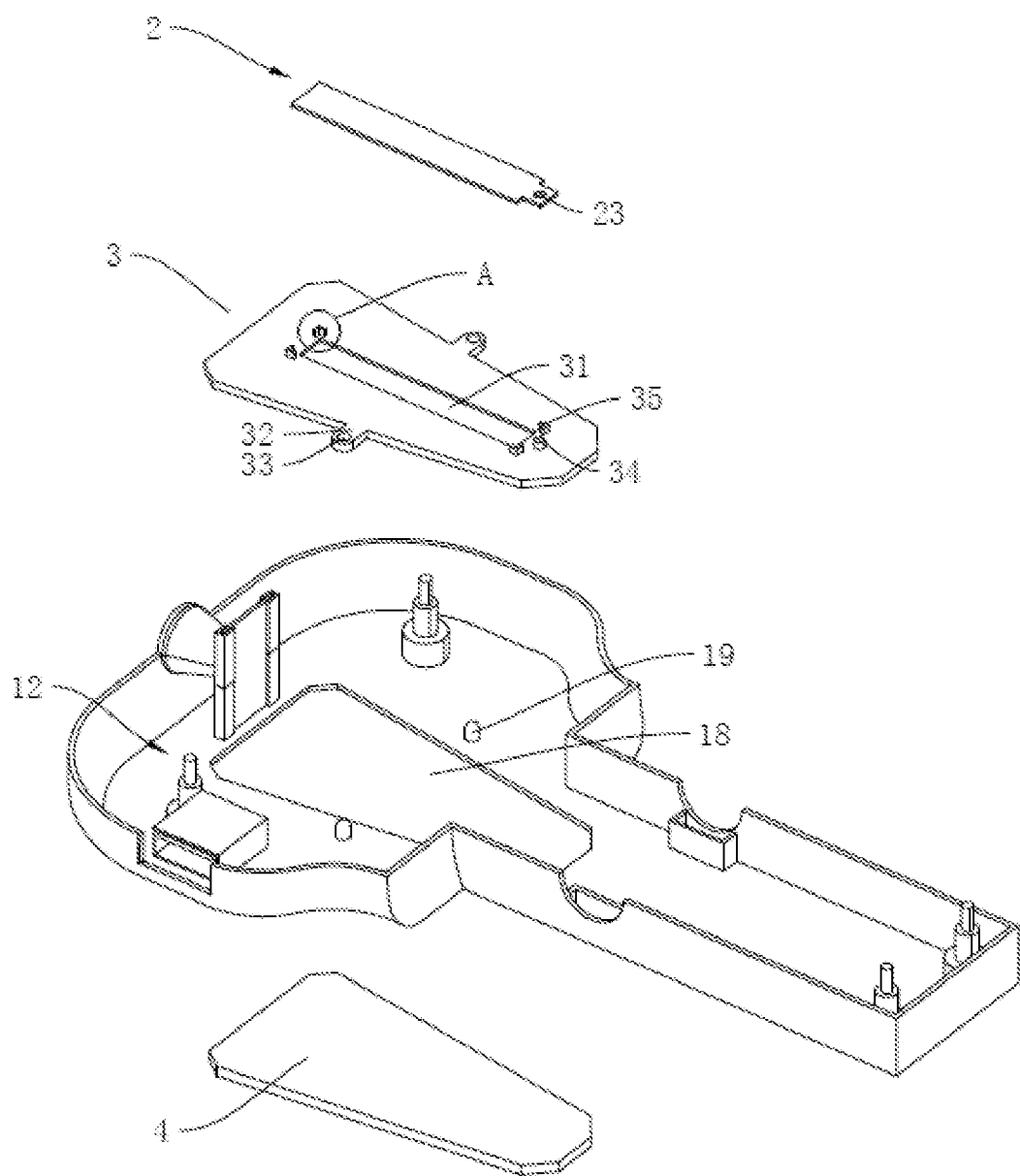
FIG. 4 is an exploded view of a lower shell, a fixing plate, a light emitting module and a transparent cover plate.

As shown in FIG. 4, a fixing plate 3 for fixing the light emitting module 2 is fixedly connected inside the lower shell 12. The light emitting module 2 is fixedly connected to one side, far away from the lower shell 12, of the fixing plate 3. The fixing plate 3 is provided with a first light-transmitting hole 31 for transmitting light of the light emitting module 2, and the lower shell 12 is provided with a second light-transmitting hole 18 for displaying the fixing plate 3.

As shown in FIGS. 2 and 4, a vertical projection of the first light-transmitting hole 31 is located within a vertical projection of the second light-transmitting hole 18; and preferably, a vertical projection of the first light-transmitting hole 31 is located at an intermediate position of the vertical projection of the second light-transmitting hole 18. In order to avoid scratching the light emitting module 2 or allowing outside dust to enter, a transparent cover plate 4 is received in the first light-transmitting hole 31. The transparent cover plate 4 can be fixedly connected with a side wall of the first light-transmitting hole 31 and can also be adhered to the fixing plate 3. The transparent cover plate 4 is preferably made of a transparent plastic material which is light and convenient to install. It should be noted that the transparent cover plate 4 can be fixed by means of clamping, adhering and other technical means known to a person skilled in the art, which will not be described in detail here.

As shown in FIG. 4, two sides of the fixing plate 3 are integrally connected with a fixing block 32, limiting convex columns 19 are fixedly connected to an inner side of the lower shell 12, and fixing holes 33 into which the limiting convex column 19 penetrate are provided in the fixing blocks 32, so as to achieve relative fixing of the fixing plate 3 and the lower shell 12 in this way. In order to improve the stability of the fixing plate 3 and the lower shell 12, the fixing plate 3 and the lower shell 12 can be further adhered and fixed by adhesives such as glue. It is also possible to bond the limiting convex column 19 to the fixing block 32 by melting the limiting convex column 19. The fixing plate 3 can be coated with a reflective coating for collecting and reflecting light emitted by the light emitting module 2, reducing the waste of light energy.

Figure 5:
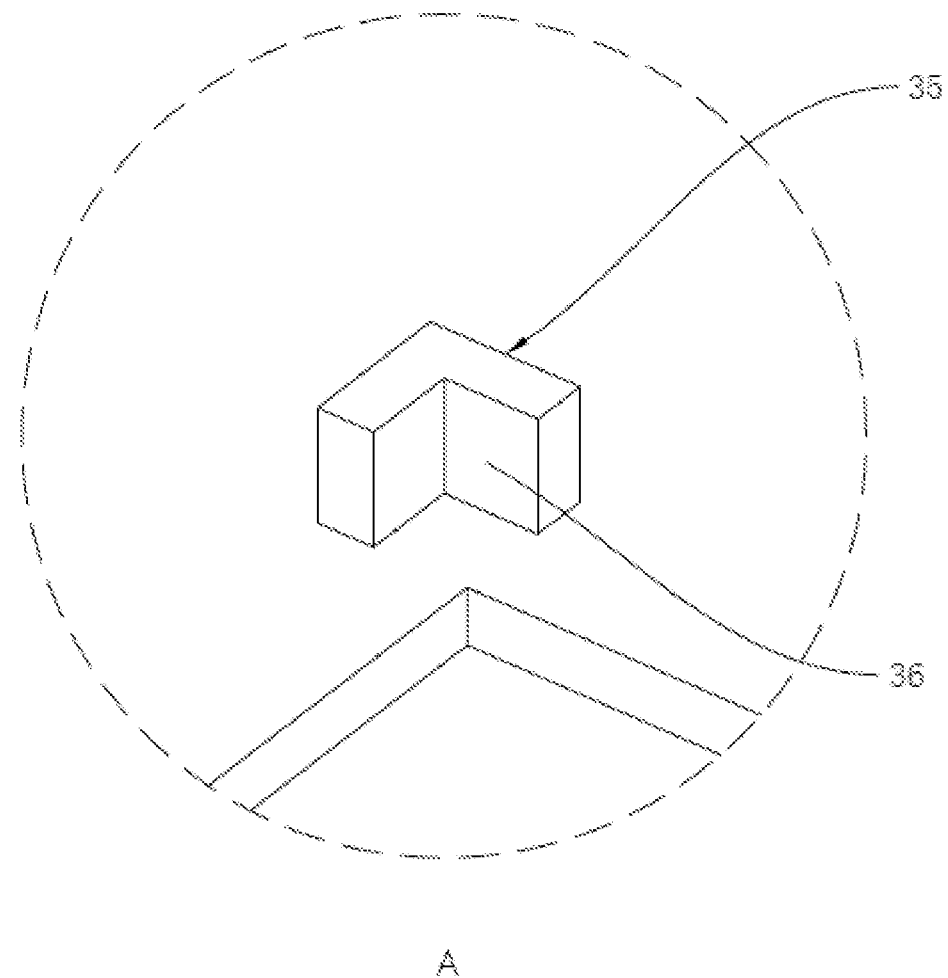
FIG. 5 is an enlarged view of portion A of FIG. 4.

As shown in FIGS. 4 and 5, the fixing plate 3 is integrally provided with a positioning protrusion 34. The light emitting module 2 is provided with a positioning hole 23 into which the positioning protrusion 34 penetrates. The fixing plate 3 is provided with limiting blocks 35 for limiting the rotation of the light emitting module 2 around the positioning protrusion 34. The limiting blocks 35 are provided with limiting grooves 36 into which the light emitting module 2 penetrates. It should be noted that the limiting blocks 35 can be provided with four at four sides of the light emitting module 2, the four sides of the light emitting module 2 penetrate into the limiting grooves 36 on the four limiting blocks 35 respectively and respectively abut against the groove walls of the limiting grooves 36; and further preferably, each of the limiting grooves 36 can be provided in an L shape, and the limiting blocks 35 are respectively provided on four apex angles of the light emitting module 2 and respectively abut against the two adjacent side edges of the light emitting module 2.

Figure 6:
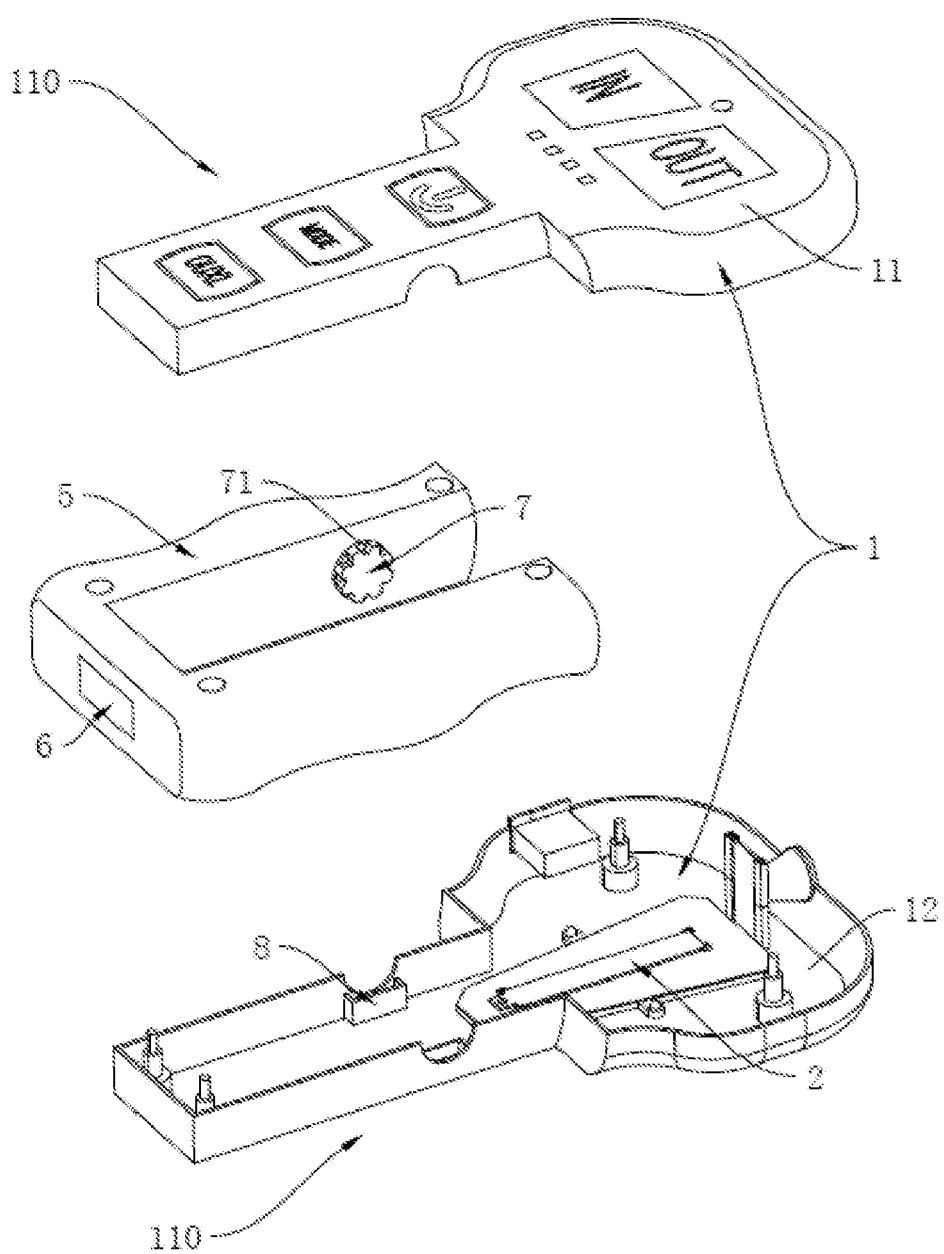
FIG. 6 is an exploded view of an upper shell, a lower shell and a grip.

As shown in FIG. 6, the shell 1 includes a gripping portion 110 which is located at one part, far away from the light emitting module 2, of the shell 1. When a person grips the remote controller, the light emitting module 2 cannot be shielded; and the gripping portion 110 is sleeved with a grip 5, the gripping portion 5 being rotatably connected to the shell 1. A rotating column 7 is fixedly connected to the grip 5, and the rotating column 7 and the grip 5 are fixedly connected by adhering and other fixing manner. The rotating column 7 penetrates into the shell 1, and the grip 5 rotates relative to the shell 1 by taking the rotating column 7 as an axis.

The part of the rotating column 7 penetrating into the shell 1 is provided with at least one tooth groove 71 along an outer circumferential surface thereof. In this embodiment, the tooth grooves 71 are preferably provided with eight and uniformly distributed. An elastic clasp 8 is provided in the shell 1 and penetrates into the tooth groove 71 to prevent the grip 5 and the shell 1 from rotating relatively. A magnet 6 is provided on the grip 5, it is to be noted that the magnet 6 can be provided at any position on the grip 5. The remote controller can be adsorbed on magnetic materials which can be adsorbed by the magnet 6 at different angles by the magnet 6 arranged at different positions. For example, it is adsorbed to the hood of an automobile when an engine or the like of the automobile is required to be repaired at night. The remote controller is adsorbed on the engine cover, so that the part to be repaired can be illuminated, without carrying lighting devices such as a flashlight. The range illuminated by the light emitting module 2 is changed by the rotation of the grip 5 and the shell 1, and so the range illuminated by the light emitting module 2 becomes larger. In this embodiment, the magnet 6 is preferably provided at one side, far away from the shell 1, of the grip 5.

The elastic clasp 8 and the tooth groove 71 on the rotating column 7 are mutually clamped in a plurality of implementation modes, specifically as follows.

Figure 7:
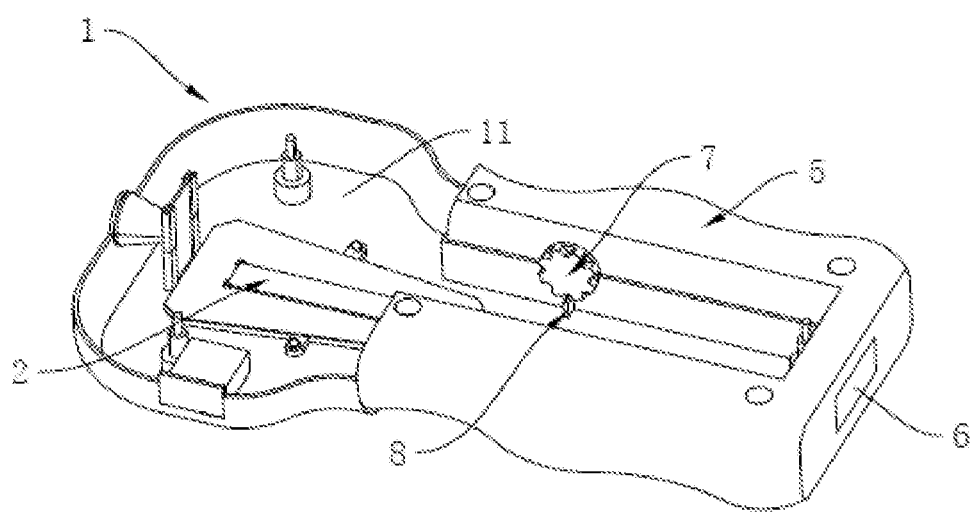
FIG. 7 is a schematic illustration of a mounting position of an elastic clasp in an embodiment.
Figure 8:
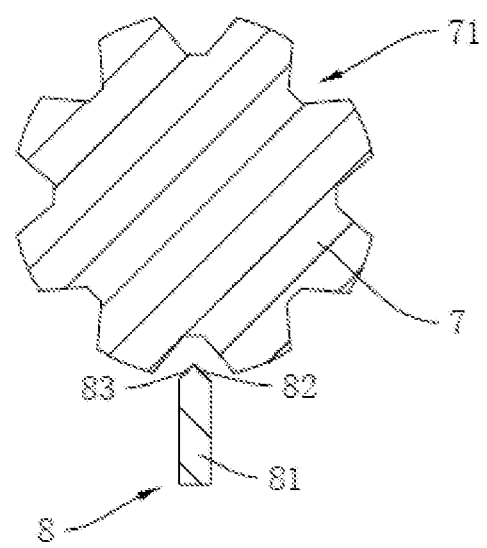
FIG. 8 is a schematic cross-sectional view of the elastic clasp and a rotating column.

As shown in FIGS. 7 and 8, in an embodiment, the elastic clasp 8 includes a clamping block 81 fixedly connected to an inner side of the upper shell 11 and/or the lower shell 12 at a portion close to a rotating column 7. The clamping block 81 penetrates into the tooth groove 71, and a part of the clamping block 81 which penetrates into the tooth groove 71 is provided with a first guide surface 82 and/or a second guide surface 83. The specific structure of the first guide surface 82 and the second guide surface 83 is shown in FIG. 8. When the rotating column 7 rotates clockwise, the rotating column 7 abuts against the first guide surface 82; and when the rotating column 7 rotates counterclockwise, the rotating column 7 abuts against the second guide surface 83. When the grip 5 and the shell 1 rotate relative to each other, the rotating column 7 and the shell 1 are driven to rotate circumferentially. Due to the fact that the clamping block 81 penetrates into the tooth groove 71, the clamping block 81 and the rotating column 7 can collide in the rotating process of the rotating column 7, further preventing rotation of the rotating column 7, and thus limiting relative rotation of the grip 5 and the shell 1.

Figure 9:
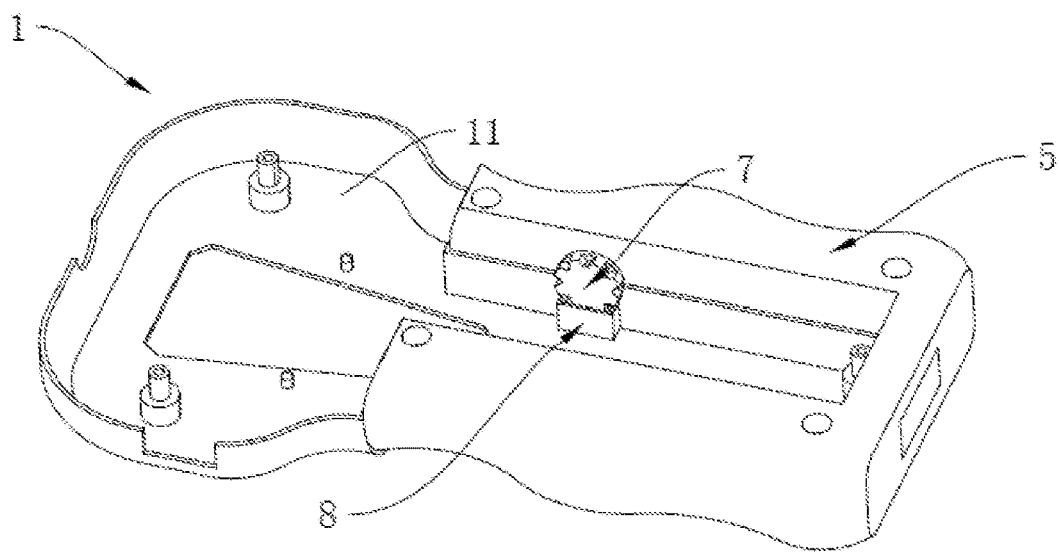
FIG. 9 is a schematic view of the mounting position of the elastic clasp.
Figure 10:
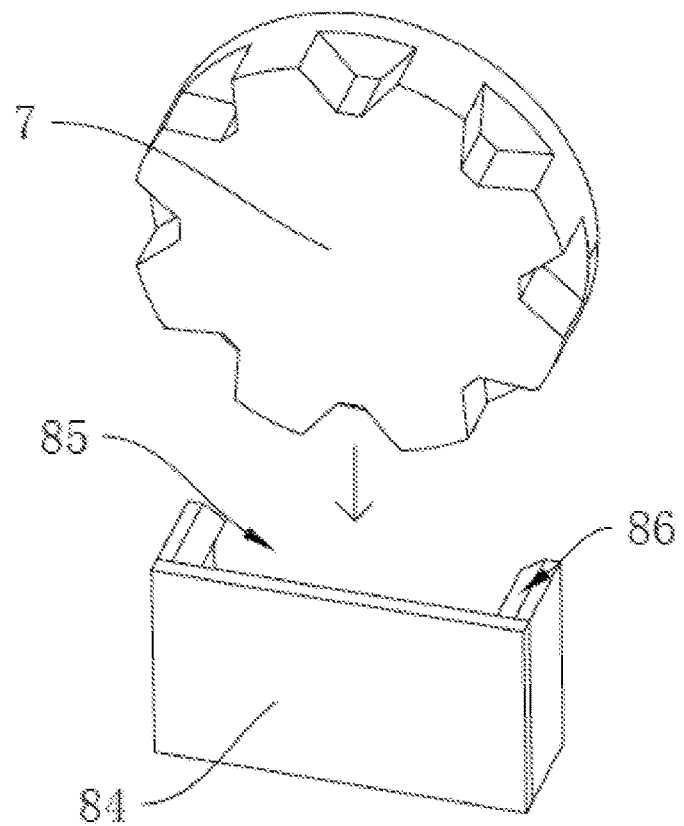
FIG. 10 is a schematic view of an assembly of a mounting block and a rotating column in an embodiment.
Figure 11:
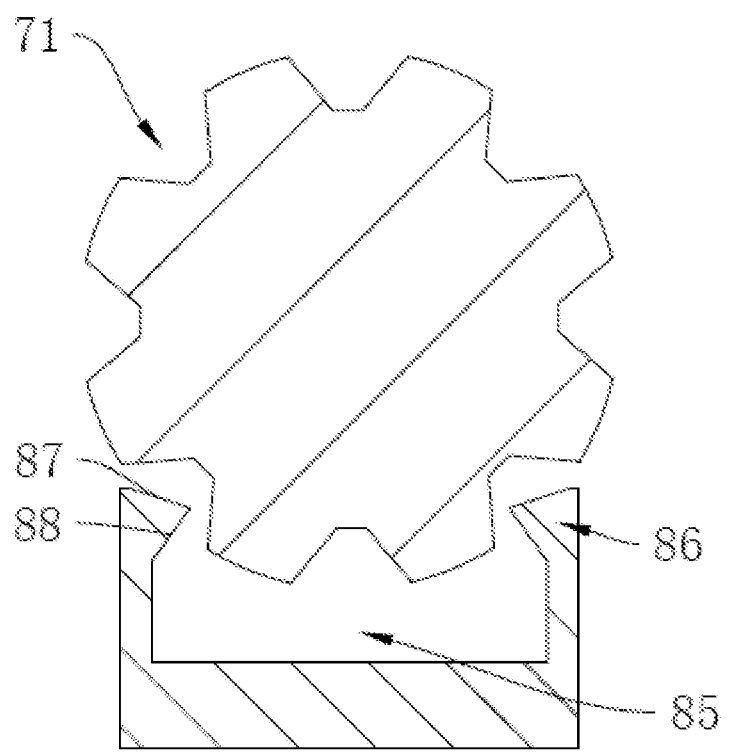
FIG. 11 is a schematic cross-sectional view of the mounting block and the rotating column.

As shown in FIGS. 9 and 10, in another embodiment, the elastic clasp 8 includes a mounting block 84 fixedly connected to an inner side of the upper and/or lower shells 11 and 12 at a portion close to a rotating column 7. A penetrating groove 85 is provided in the mounting block 84, and a part of the rotating column 7 on one side of the tooth groove 71 penetrates into the penetrating groove 85. At least one side wall of the penetrating groove 85 is provided with a clamping block 86, and a clearance is provided on the mounting blocks 84 and the side walls adjacent to the penetrating groove 85. The fixture block 86 penetrates into the tooth groove 71, and a part of the fixture block 86 penetrating into the tooth groove 71 is provided with a third guide surface 87 and/or a fourth guide surface 88. The specific structures of the third guide surface 87 and the fourth guide surface 88 are shown in FIG. 11. The third guide surface 87 is provided at one end, far away from the groove bottom of the penetrating groove 85, of the clamping block 86 and provided obliquely downwards. The fourth guide surface 88 is provided at one end, close to the groove bottom of the penetrating groove 85, of the clamping block 86 and provided obliquely upwards. In the embodiment, only the clamping blocks 86 on one side wall can be used for clamping, and the clamping can also be realized by combining the clamping blocks 86 on a plurality of side walls. In the embodiment, the clamping blocks 86 are preferably provided with two and are provided on both side walls of the limiting groove 36. When the grip 5 and the shell 1 rotate relative to each other, the rotating column 7 and the shell 1 are driven to rotate circumferentially. Due to the fact that the clamping block 86 penetrates into the tooth groove 71, the clamping block 86 and the rotating column 7 can collide in the rotating process of the rotating column 7, further preventing rotation of the rotating column 7, and thus limiting relative rotation of the grip 5 and the shell 1.

The mounting modes of the different elastic clasps 8 in the two embodiments can play the same limiting role, and it is to be noted that the elastic clasps 8 are preferably made of materials such as rubber or plastic which can generate certain elastic deformation. When the elastic clasps 8 and the rotating column 7 collide with each other, the increased strength of the rotating grip 5 can deform the elastic clasps 8 and cause the rotating column 7 to continue to rotate. Meanwhile, the first guide surface 82, the second guide surface 83, the third guide surface 87 and the fourth guide surface 88 are provided so that the rotation of the rotating shaft is smoother. When the elastic clasp 8 and the rotating column 7 are separated from each other, the elastic clasp 8 returns to the original state and continues to penetrate into the tooth groove 71, so as to restrict the relative rotation of the grip 5 and the shell 1 again.

There are various implementations for the structure of the grip 5, specifically as follows.

Figure 12:
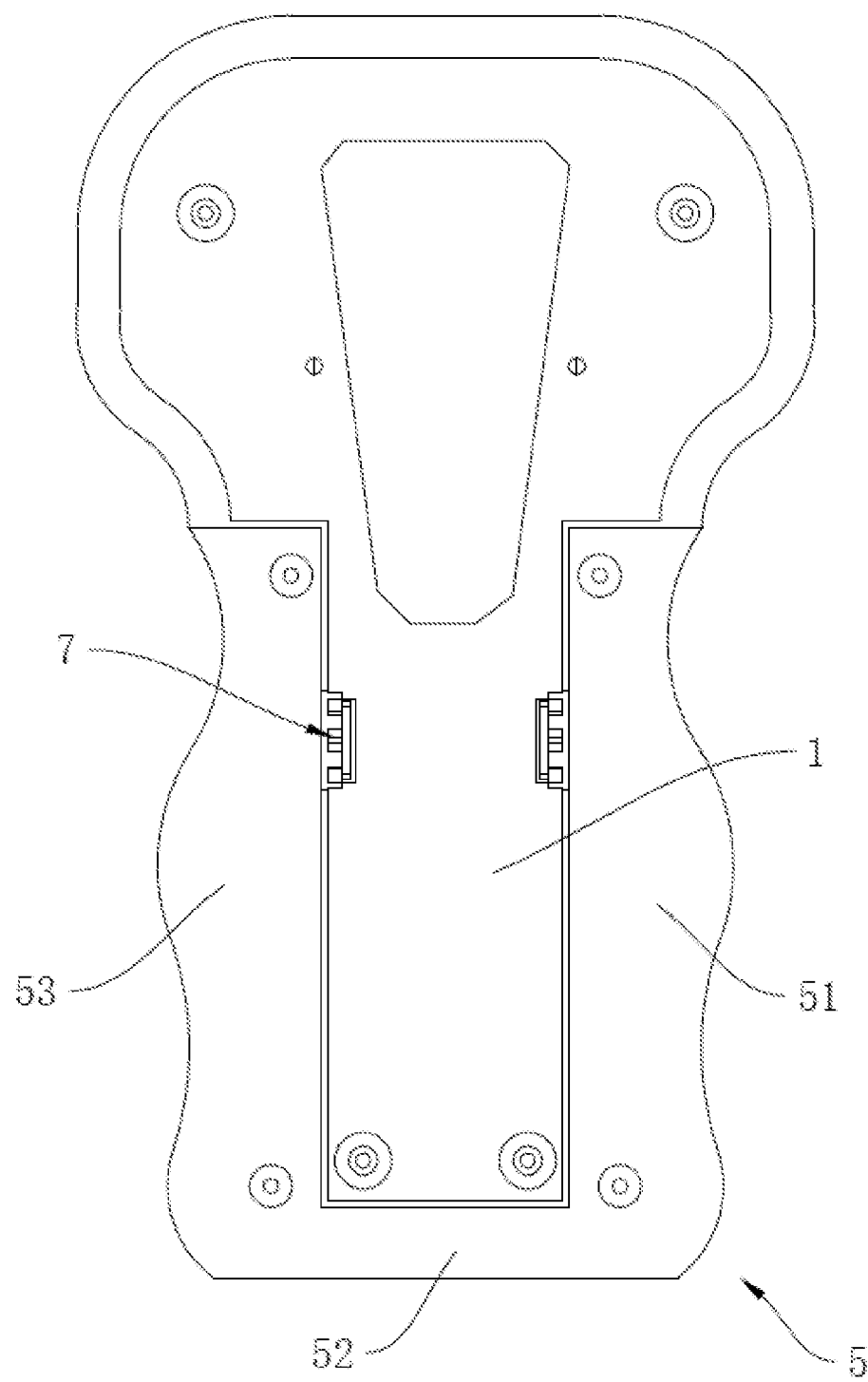
FIG. 12 is a schematic view showing the mounting structure of a rotating column and a grip in an embodiment.

As shown in FIG. 12, in an embodiment, the grip 5 includes a first connecting portion 51, a second connecting portion 52, and a third connecting portion 53. The first connecting portion 51 and the third connecting portion 53 are provided at both ends of the second connecting portion 52, the outer sides of the first connecting portion 51 and the third connecting portion 53 are wave-shaped, and the arrangement is used for improving comfort when a person grips the remote controller. Meanwhile, the contact area between the hand and the grip 5 is increased, so that it can be grasped more tightly by the hand.

Figure 13:
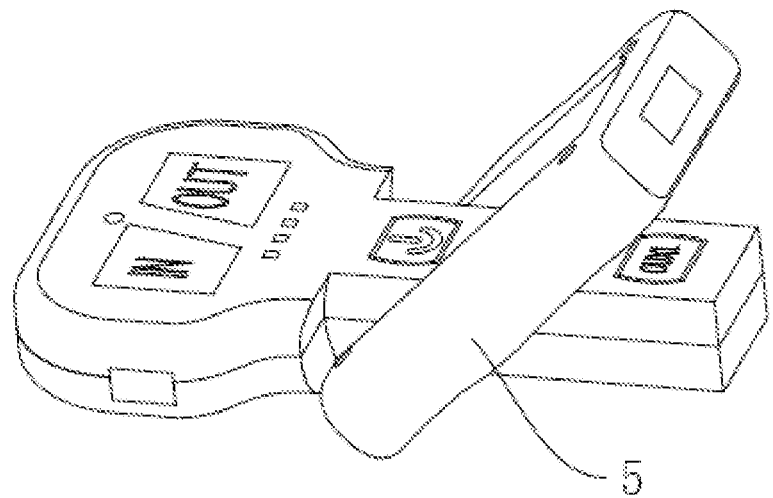
FIG. 13 is a structurally schematic view when the grip is rotated upward.
Figure 14:
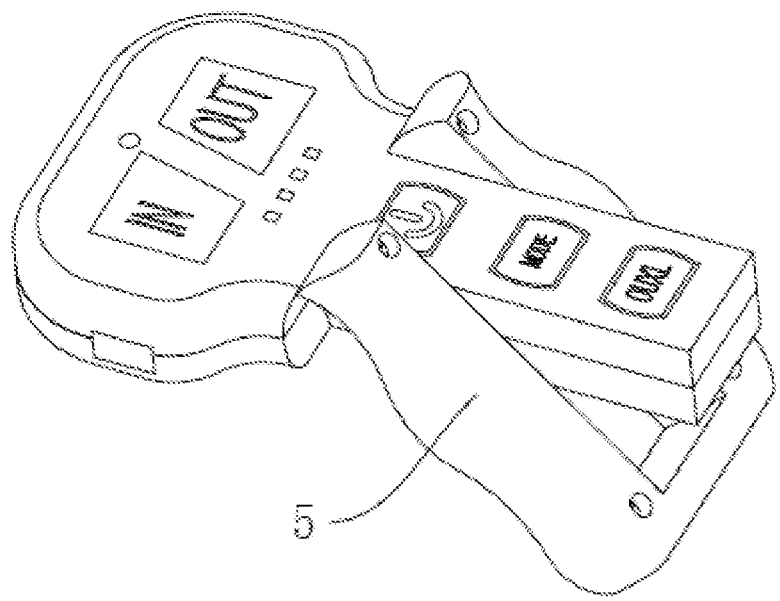
FIG. 14 is a structurally schematic view when the grip is rotated downward.

The rotating column 7 is fixedly connected to one side, close to the shell 1, of the first connecting portion 51 and/or the third connecting portion 53. A schematic view of the grip rotation in this embodiment is shown in FIGS. 13 and 14.

The first connecting portion 51, the second connecting portion 52 and the third connecting portion 53 are relatively fixedly connected when the rotating columns 7 are fixed on both the first connecting portion 51 and the third connecting portion 53. The rotating column 7 penetrates into the shell 1, the grip 5 rotates relative to the shell 1 by taking the rotating column 7 as an axis, and the rotating column 7 is provided on the first connecting part 51 and the second connecting part 52, so that the function of relatively limiting the grip 5 can be achieved. When the grip 5 has a tendency to be separated relatively from the rotating column 7, the grip 5 and the shell 1 are prevented from being separated from each other by abutting the outer circumferential surface of the rotating column 7 with the shell 1.

Figure 15:
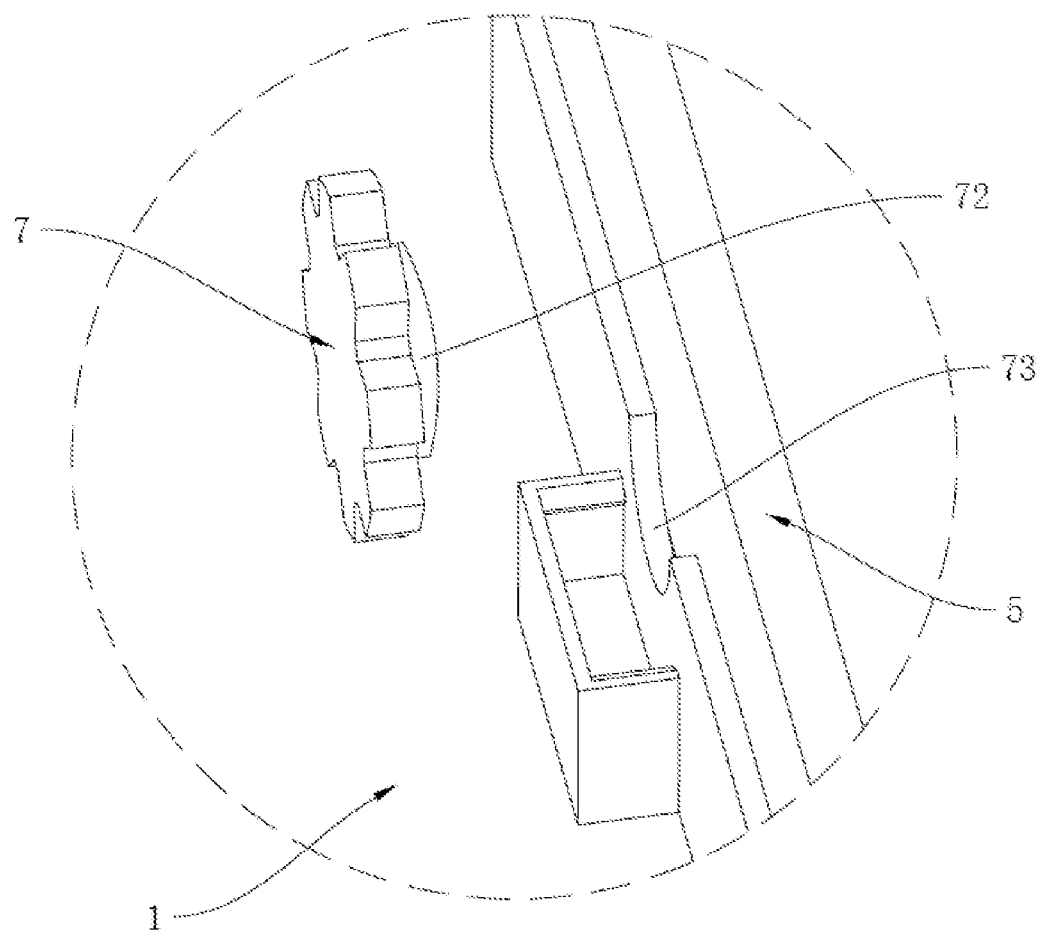
FIG. 15 is a structurally schematic view of the rotating column when the rotating column is provided on a single side.

It should be noted that, when the rotating column 7 is fixed only by the first connecting portion 51 or the third connecting portion 53, the rotating column 7 is required to be provided with a connecting shaft 72. As shown in FIG. 15, a penetrating recess 73 into which the connecting shaft 72 penetrates is provided on the shell 1 at a portion where the rotating column 7 penetrates into the shell 1. When the connecting shaft 72 penetrates into the penetrating recess 73, the rotating column 7 and an inner wall of the shell 1 abut against each other to realize limiting, and the grip 5 is prevented from being separated from the shell 1.

Figure 16:
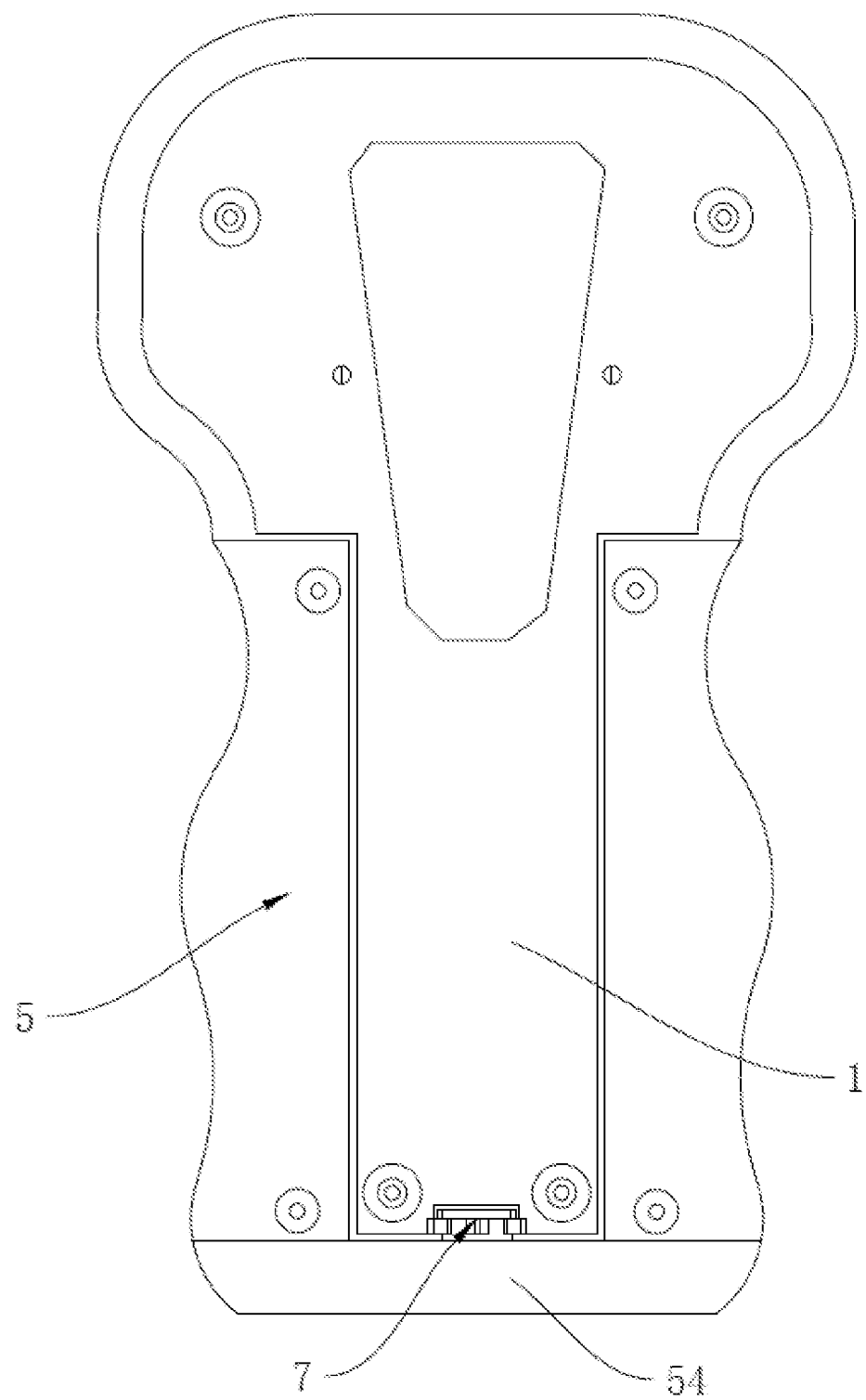
FIG. 16 is a schematic view showing the mounting structure of a rotating column and a grip in an embodiment.

As shown in FIG. 16, in an embodiment, the grip 5 includes a fourth connecting part 54. The rotating column 7 is fixedly connected to one side, close to the shell 1, of the fourth connecting part 54. The rotating column 7 penetrates into the shell 1, and the grip 5 rotates relative to the shell 1 by taking the rotating column 7 as an axis. It should be noted that in the present embodiment, the rotating column 7 is required to be provided with a connecting shaft 72. As shown in FIG. 15, a penetrating recess 73 into which the connecting shaft 72 penetrates is provided on the shell 1 at a portion where the rotating column 7 penetrates into the shell 1. When the connecting shaft 72 penetrates into the penetrating recess 73, the rotating column 7 and the inner wall of the shell 1 abut against each other to realize limiting, and the grip 5 is prevented from being separated from the shell 1.

Figure 17:
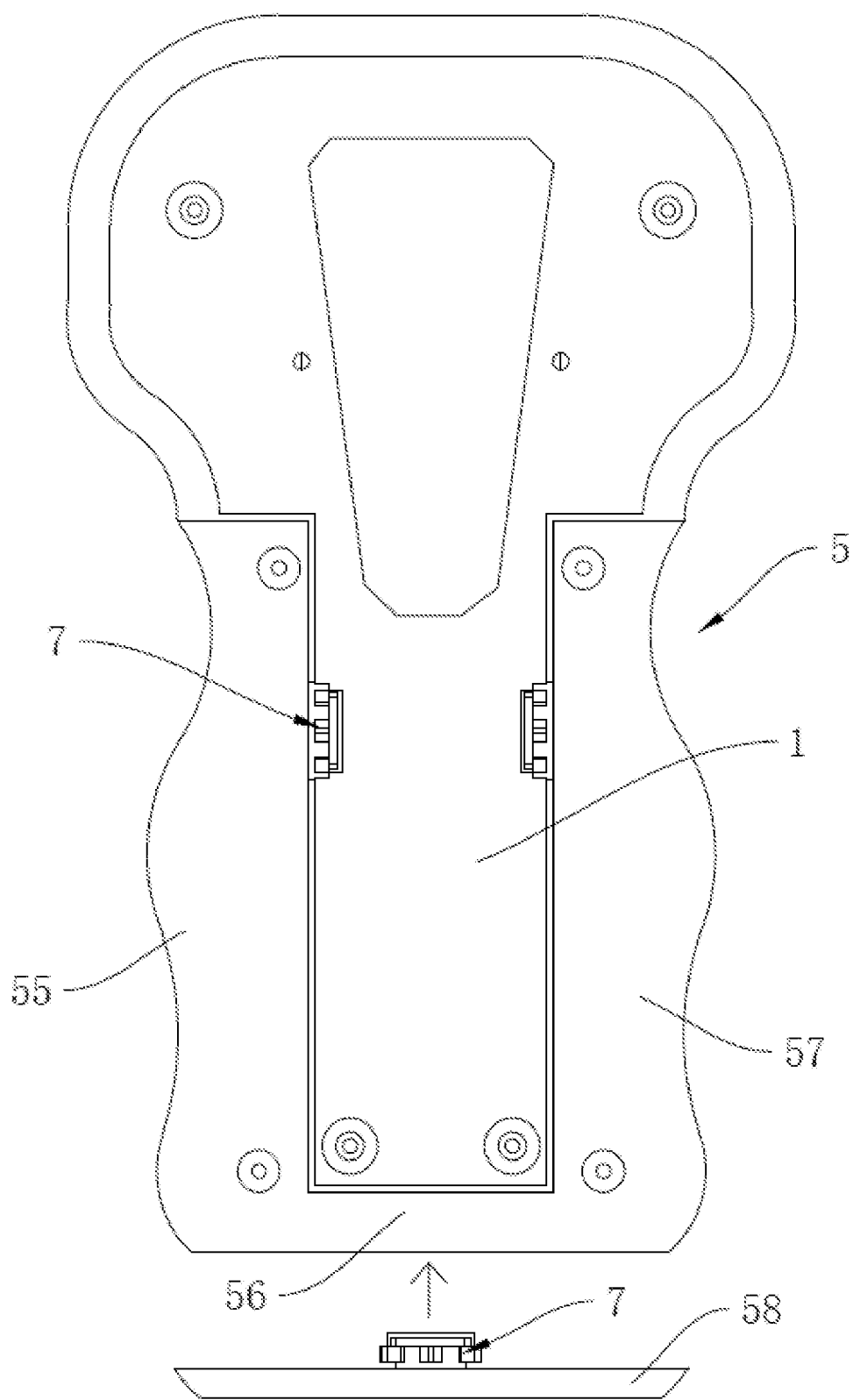
FIG. 17 is a schematic view showing the assembly structure of a rotating column and a grip in an embodiment.

As shown in FIG. 17, in an embodiment, the grip 5 includes a fifth connecting portion 55, a sixth connecting portion 56, a seventh connecting portion 57, and an eighth connecting portion 58, the fifth connecting portion 55 and the seventh connecting portion 57 being provided at both ends of the sixth connecting portion 56, and the eighth connecting portion 58 being provided at an end, far away from the shell 1, of the seventh connecting portion 57.

The rotating column 7 is fixedly connected to one side, close to the shell 1, of the fifth connecting portion 55 and/or the seventh connecting portion 57, one end, close to the seventh connecting portion 57, of the eighth connecting portion 58, or one end, close to the eighth connecting portion 58, of the seventh connecting portion 57.

The grip 5 can rotate in two stages. The rotating column 7 provided on the fifth connecting part 55 and/or the seventh connecting part 57 penetrates into the shell 1, the grip 5 rotates relative to the shell 1 by taking the rotating column 7 as an axis, and the eighth connecting part 58 can also rotate relative to the seventh connecting part 57 by taking the rotating column 7 as an axis, so that various rotating modes are realized. It should be noted that the rotation and the limiting manners of the eighth connecting portion 58 and the seventh connecting portion 57 are similar to those of the previous embodiment and will not be described in detail herein.

The arrangement modes of the rotating columns 7 in the three embodiments can achieve the purpose of relatively rotating the grip 5 and the shell 1 so as to realize the movement and transformation of the illuminated area of the light emitting module 2. The two embodiments of the rotating columns 7 can be mutually combined with various embodiments of the elastic clasps 8 to form different technical solutions.

The specific working process of the embodiment is as follows.

The lighting module 2 is turned on by pressing the lighting button 17, so that the lighting function is realized. When it needs to illuminate a certain area for a long time, the shell 1 fixes the remote controller in a manner that the magnet 6 is adsorbed to the iron, and meanwhile the shell 1 rotates relative to the grip 5 by taking the rotating column 7 as an axis to adjust the lighting area of the lighting module 2.

The embodiments of the detailed description are preferred embodiments of the disclosure, and do not limit the scope of protection of the disclosure accordingly. Any equivalent changes made in the structure, shape and principle of the present disclosure shall be covered within the scope of protection of the present disclosure.

What is claimed is:

1. A remote controller comprising a shell having an upper shell and a lower shell, the remote controller further comprising a light emitting module and a fixing plate for fixing the light emitting module, wherein the fixing plate is fixedly connected to an inner side of the lower shell; the light emitting module is fixedly connected to one side, far away from the lower shell, of the fixing plate; the fixing plate is provided with a first light-transmitting hole for displaying the light emitting module; and the lower shell is provided with a second light-transmitting hole for displaying the fixing plate, wherein the shell comprises a gripping portion, an outside of the gripping portion is sleeved with a grip, the grip being rotatably connected to the shell, a rotating column is fixedly connected to the grip and penetrates into the shell; and the grip rotates relative to the shell in an axial direction of the rotating column.

2. The remote controller according to claim 1, wherein fixing blocks are respectfully fixedly connected to both sides of the fixing plate, limiting convex columns are fixedly connected to the inner side of the lower shell, and fixing holes into which the limiting convex columns respectfully penetrate are provided in the fixing blocks.

3. The remote controller according to claim 2, wherein the fixing plate is provided with a positioning protrusion; the light emitting module is provided with a positioning hole into which the positioning protrusion penetrates; and the fixing plate is provided with limiting blocks for limiting a rotation of the light emitting module around the positioning protrusion.

4. The remote controller according to claim 3, wherein the limiting blocks are provided with limiting grooves into which the light emitting module penetrates; the limiting blocks are provided at four apex angles of the light emitting module; and a groove wall of each of the limiting grooves abuts against a side edge of the light emitting module.

5. The remote controller according to claim 1, wherein a transparent cover plate is provided in the first light-transmitting hole.

6. The remote controller according to claim 1, wherein a part of the rotating column penetrating into the shell is provided with at least one tooth groove along an outer circumferential surface thereof; and an elastic clasp is provided in the shell and penetrates into the tooth groove to prevent the grip and the shell from rotating relatively.

7. The remote controller according to claim 6, wherein the grip is provided with a magnet.

* * * * *